United States Patent [19]

Fasig et al.

[11] 4,365,151
[45] Dec. 21, 1982

[54] SENSOR FOR A DOCUMENT PROCESSOR

[75] Inventors: Harold A. Fasig, Plymouth; Anthony Horak, Detroit, both of Mich.

[73] Assignee: Burroughs Corporation, Detroit, Mich.

[21] Appl. No.: 183,012

[22] Filed: Sep. 2, 1980

[51] Int. Cl.³ .............................................. G01V 9/04
[52] U.S. Cl. ............................ 250/222 R; 250/223 R
[58] Field of Search ............. 250/221, 222 R, 222 PC, 250/223 R, 231 SE, 239

[56] References Cited

U.S. PATENT DOCUMENTS

| | | | |
|---|---|---|---|
| 2,834,450 | 5/1958 | Govin | 250/223 R |
| 3,450,887 | 6/1969 | Nirenberg | 250/223 R |
| 3,709,604 | 1/1973 | Niesen et al. | 250/222 R |
| 3,737,666 | 6/1973 | Dutro | 250/223 R |
| 4,207,464 | 6/1980 | Fukuyama et al. | 250/239 |

Primary Examiner—David C. Nelms
Attorney, Agent, or Firm—Delbert P. Warner; Charles E. Quarton; Kevin R. Peterson

[57] ABSTRACT

Apparatus for detecting the presence of documents in a document pathway employing a light source and a light sensor positioned to function in cooperation with a drum. The drum employs a peripheral surface for support of documents as they are transported across a cylindrical surface which is recessed below the peripheral surface for reflecting light. The positions of the light source and the sensor are selected so that, when no document is present, light from the light source will be reflected from the recessed cylindrical surface onto the sensor enabling the sensor to provide an output indicating no document is present. When a document is present, light from the light source will be reflected from the surface of the document along a path which will substantially miss the sensor and not energize it, thereby enabling associated circuitry to determine that a document is present.

9 Claims, 8 Drawing Figures

SENSOR FOR A DOCUMENT PROCESSOR

CROSS REFERENCE TO RELATED APPLICATION

A U.S. patent application Ser. No. 155,053 entitled "Track Sensor Controller", which was filed in the name of Harold A. Fasig and Eugene E. Paananen on June 2, 1980 and assigned to the same assignee as the present invention, is hereby incorporated by reference.

BACKGROUND OF THE INVENTION

1. Field of the Invention

This invention relates to the arrangement of sensors, employed with light sources, for detecting whether or not documents are present in the pathway of a document processor. It relates particularly to the arrangement of the light source and the sensor on one side of the pathway opposite an opaque drum having a semi-polished surface, recessed from its outer surface, which provides a good reflection from the light source to energize the sensor when no document is present. The arrangement is such, when a document is present, that the reflection is diverted along a separate path with reduced intensity and the sensor is not energized.

2. Description of the Prior Art

The prior art includes configurations of light sources, such as LED's, which are arranged on one side of a document path so that, when no documents are present, light will be transmitted to phototransistors on the opposite side of the document path. When documents break the beam, logic circuitry associated with the phototransistors provides suitable outputs. An arrangement of this kind employing phototransistors, positioned opposite to LED's, to receive transmitted light is not usable in the environment of interest in the present instance in which an obstruction exists in the form of an alignment drum through which light cannot be transmitted between the LED and the phototransistor.

Other prior art arrangements employ a light source and a photosensor which are positioned on the same side of the document path in such a way that light from the light source is reflected from the surface of a document into the sensor which then produces an output. While such an arrangement may appear to be usable with an opaque drum, as in the environment of interest in the present case, known prior art systems have not proven to be satisfactory, since they necessitate maintaining the sensor pair in a very precise alignment with respect to the reflecting surface for reliable operation and require special drive electronics which is different than that used with the track system of interest.

The present invention avoids the difficulties inherent in the prior art referred to above. It combines the use of common drive electronics with the off-the-shelf light source/sensor combinations, such as LED/phototransistors or LED/photo diodes, used throughout the track system. Each in mounting the light source/sensor is enabled while reliable break-type operation is assured.

BRIEF SUMMARY OF THE INVENTION

An arrangement of a light source and a light sensor is shown for use in detecting the passage of documents in a document sorter. The light source and sensor are supported by suitable brackets opposite an opaque aligning drum. The drum has a flat-bottomed groove around its periphery, the bottom being polished or semi-polished to reflect light. When no documents are present and the light source, sensor and drum are arranged in the inventive configuration, light from the light source is reflected from the semi-polished surface in a pattern which strikes the sensor, enabling it to provide a signal indicating that no document is present.

When a document is present in the path of light from the light source, the reflected light from the document surface is of lesser intensity than that from the semi-polished portion of the drum and it is reflected over a different path. As a consequence of less light and of the light being reflected along a path away from the sensor, the sensor is not energized. The lack of signal from the sensor is then interpreted as meaning a document is present.

DESCRIPTION OF A PREFERRED EMBODIMENT

Figure 1:
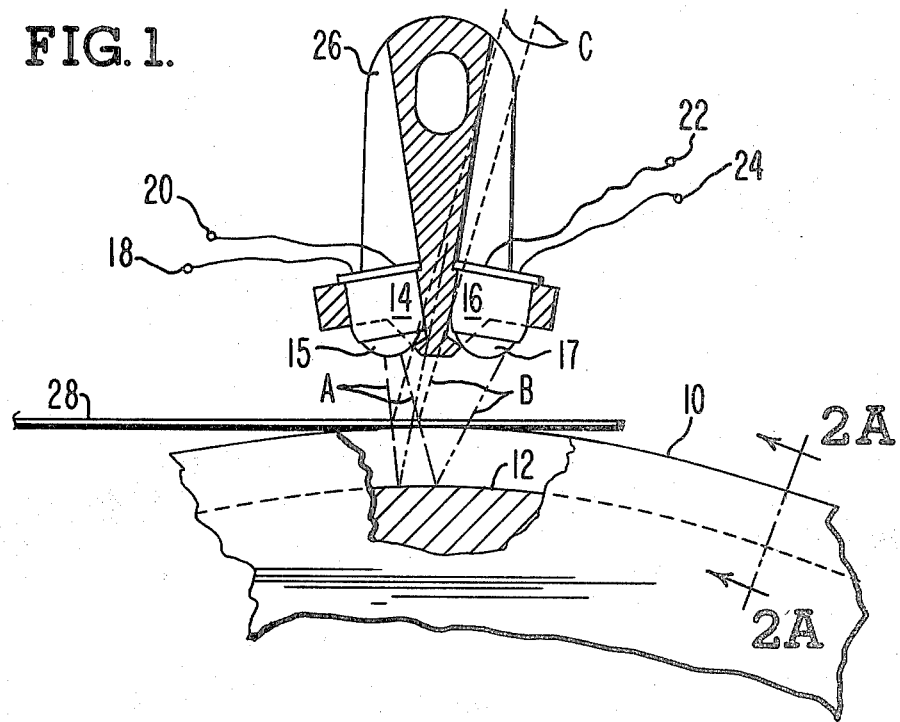
FIG. 1 is a view of an embodiment of the invention showing relationships involved, in accordance with the invention, in reflecting light from a reflective groove in a drum as contrasted to relationships existing when light is reflected from a document positioned tangent to the face of the drum.

Turning to FIG. 1, a portion of the periphery of a drum, which serves as the document carrying surface of the drum, is indicated at 10. A flat-bottomed groove around the circumference of the drum has a cylindrical face 12 which may be referred to as the reflective surface of the drum and is semi-polished to reflect light from the lens 15 of a light emitting diode, or LED, 14 into the lens 17 of a phototransistor, or PT, at 16.

Suitable connections to terminals at 18 and 20 provide power to cause the LED 14 to illuminate the phototransistor 16 to a desired level in much the same way as is described in the above referenced patent application Ser. No. 155,053. The phototransistor, in turn, will provide suitable signals over terminals 22 and 24 to a controller circuit such as that shown in FIG. 7 and described more fully in the referenced patent application.

The LED 14 and phototransistor 16 are supported, as shown, by a bracket 26 which is detailed in FIGS. 3, 4, 5 and 6. The bracket provides alignment of the LFD and the phototransistor such that light transmitted from the LED along phantom lines A directed from the end of the LED will be reflected from the surface 12 back towards the phototransistor along phantom lines B. When the path of light from 14 is blocked by an opaque body such as a document at 28, the light will be reflected back along a path identified by phantom lines C. Light transmitted along the path identified by phantom lines C bypasses the phototransistor to a large extent causing the phototransistor to provide a different signal indicating that a document is present.

Figure 2A:
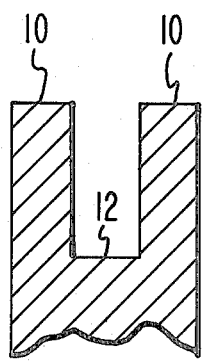
FIG. 2A is a sectional view, not to scale, along the line 2A—2A of FIG. 1 showing a cross-section of the drum and the reflective groove in accordance with an embodiment of the invention.
Figure 2B:
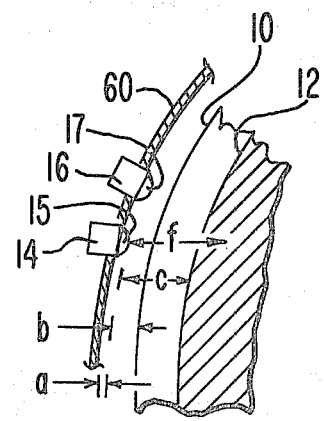
FIG. 2B is a view in partial section showing further details of the embodiment of the invention in FIG. 1.

It will be noted that FIG. 1 is not drawn to scale, since important relationships would be obscured if that were done. FIG. 2B is provided to illustrate a portion of FIG. 1 to provide details concerning scale together with a portion of a document guide 60. The guide 60 forms a guide path extending through an arc of about 90° adjacent to the drum to divert documents from a linear path through an angle of about 90° into another linear path.

As indicated in FIG. 2B, an LED and a PT, 14 and 16 respectively, are extended through the wall of the guide 60 so that lenses 15 and 17 extend beyond the inner wall by a distance a. The distance from the tops of the lenses 15 and 17 to the face of the drum at 10 is given as a distance b. The distance from the tops of the lenses 15 and 17 to the bottom of the slot at 12 is given as c. The focal length of the lenses 15 and 17 are given as f. In a particular embodiment these values are as follows: a=0.020 in., b=0.040 in, c=0.380 in. and f=0.400 in. Light from the LED will be spread over an angle of from 18° to 22° in contrast to the 8° or so indicated by lines A on FIG. 1. The close spacing between the lenses 15, 17 and the face 10 of the drum affords an advantage in that it enables cleaning action to be effected as the documents pass between the face 10 of the drum and the inner surface of the document guide 60. As each document approaches and leaves the vicinity of an LED-PT combination, its free end may sweep across the smooth surface of the lenses 15 and 17 to sweep dust or other debris away. In this way, the system operates to be self-cleaning.

Figure 5:
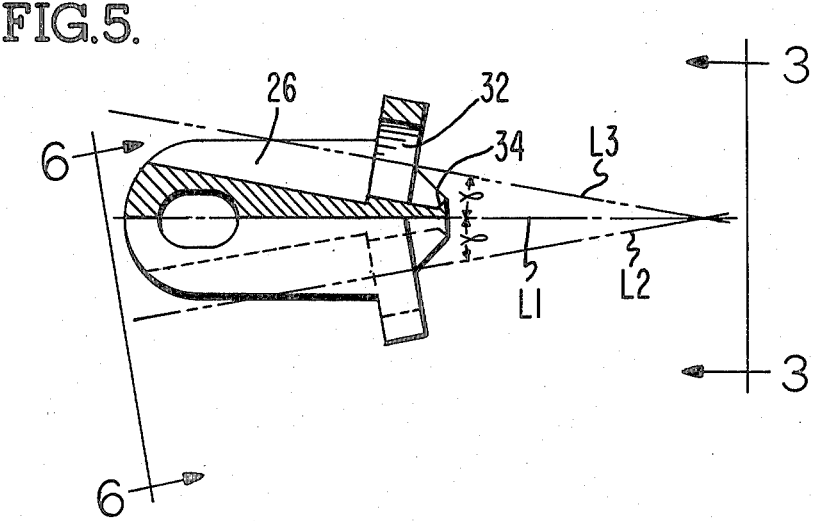
FIG. 5 is a side view of the housing shown in FIG. 3 and includes a showing of certain angular relationships between axes of the light source and the light sensor.
Figure 3:
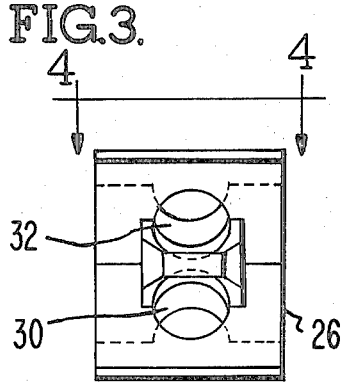
FIG. 3 is a front view of a housing for supporting a light source and sensor, corresponding to the view along line 3—3 in FIG. 5.
Figure 4:
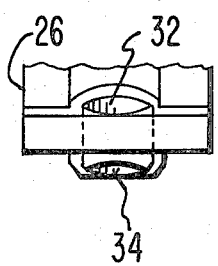
FIG. 4 is a top view along line 4—4 of the housing shown in FIG. 3.
Figure 6:
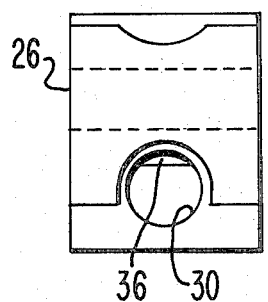
FIG. 6 is an end view of the housing shown in FIG. 5, as seen from the view indicated by line 6—6.

Details of an exemplary bracket 26 are shown in FIGS. 3, 4, 5 and 6. FIG. 5 shows the bracket in partial section from the same viewpoint as shown in FIG. 1, but without the LED and the phototransistor. In this view, seats are shown at 30 and 32 to receive and support an LED and a phototransistor, respectively. A lip at 34 associated with the seat 32 and a comparable lip 36 (FIG. 6) associated with seat 30 serve as stops establishing limits preventing the LED and the phototransistor from advancing beyond the forward edges of the seats.

The lips 34 and 36 also function as screens to reduce the amount of undesirable stray light which otherwise would be transmitted from the LED to the PT. Of particular interest is the reduction in the light transmitted from the LED to the PT when a document is present. By their placement, the lips 34 and 36 greatly reduce light transmission over a path which should not be illuminated for the successful operation of the present invention.

The longitudinal axis L1 through the center of the bracket 26 is positioned at angles α relative to an axis L2 through the seat 30 and the axis L3 through the seat 32. As shown in FIG. 5, the angles are about 10°, but in a preferred embodiment, the angles α will equal 14° 30", thereby establishing an angle of 29° between longitudinal axes L2 and L3.

Figure 7:
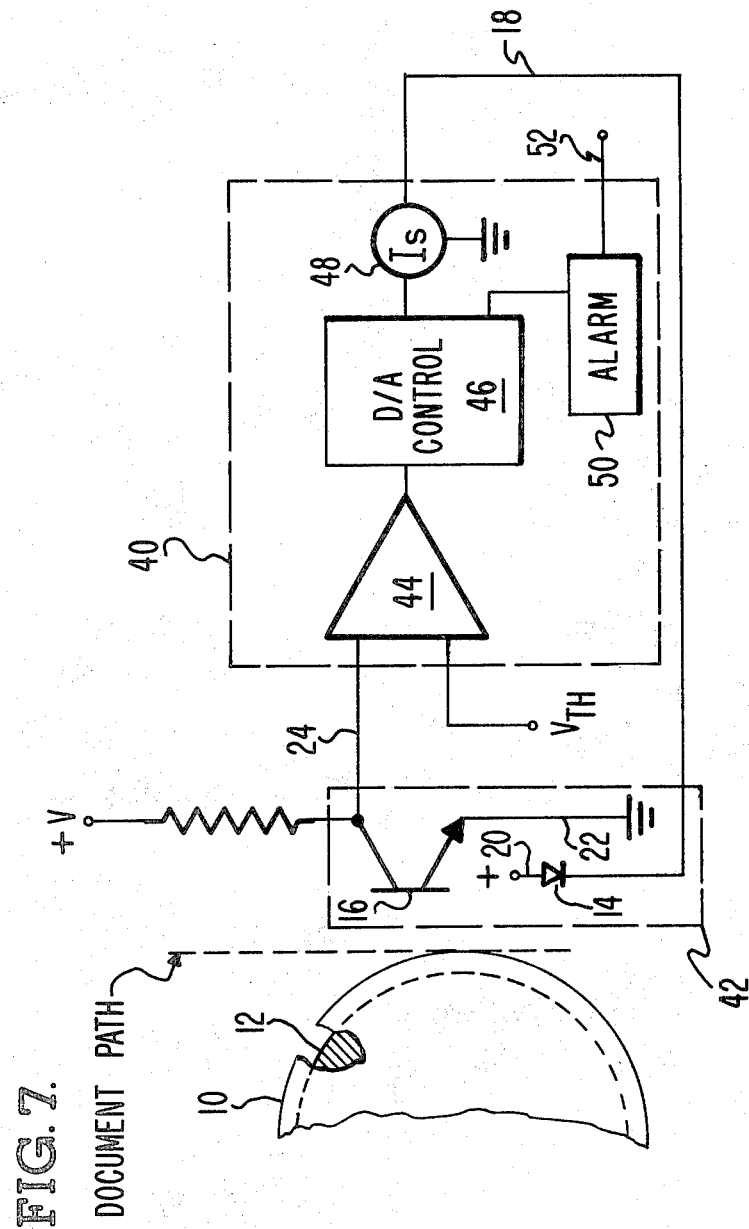
FIG. 7 is a schematic diagram illustrating the general configuration of a preferred track sensor controller and a sensor system for the sorter track of a document sorting machine.

FIG. 7 is a schematic representation of a track sensor controller, or TSC, 40 and an associated sensing station 42. Reference may be made to the patent application referenced above for a detailed discussion of similar apparatus. In a preferred embodiment, the track sensor controller may be composed of a number of separate commercially available integrated circuits. In an embodiment preferred for use with a large number of document sorters, the TSC will comprise an integrated circuit combining the separate functions of the referenced separate integrated circuits.

The TSC at 40 includes three principle parts. The first of these is a document leading and trailing edge detector 44. A second part is a digital-to-analog (D/A) converter and its associated control logic at 46, which provides control for a current source $I_S$ shown at 48. A third part is a current alarm at 50 for providing an alarm signal over terminal 52 when there is a failure of LED-PT sensors or when other conditions occur which cause excursions of the D/A converter output beyond prescribed limits.

The sensing station at 42 will be positioned along the transport path of a document feeder, such as that disclosed in a copending U.S. patent application Ser. No. 110,593 entitled "Constant Spacing Document Feeder". The sensing station includes a light emitting diode or LED at 14 and a phototransistor or PT at 16 which are positioned opposite the face of an aligning drum, as previously indicated, to detect the presence of documents.

When no documents are present in the document path, light from the LED at 14 will be reflected to the PT 16 to establish a value determined by a comparison between the potential over line 24 from the collector of the phototransistor and a reference potential $V_{TH}$. If the collector value is high, the current supplied from current source 48 will be reduced to diminish the power supplied to the LED. If the potential on the collector is low, current supplied to the LED will be increased to increase the emission of light. When a document is moved through the document path, light from the LED is blocked between the time the leading edge and the trailing edge of the document pass between the LED and the PT, causing the TSC 40 to react accordingly. The TSC then provides a signal from the D/A Control 46 to a farther controller, as described in the above referenced patent application Ser. No. 155,053.

What is claimed is:

1. A system, in a document processing machine having a document track, for use in detecting the passage of documents along the track, comprising:

an alignment drum having a substantially cylindrical outer surface aligned along the track to aid in the transport of documents;

said drum including a reflective substantially cylindrical surface recessed below said outer surface;

a light source and a light sensor; and means, including a housing, supporting said light source and said light sensor in positions to enable light from said light source to be reflected from said reflective surface of the drum over a path to energize the light sensor and cause the light sensor to provide an output indicative of the absence of a document from the path adjacent to the drum;

the alignment of said outer surface of said drum relative to the housing enabling light to be reflected from the surface of a document present in the track, adjacent to the drum, over a path which substantially misses the sensor, causing the sensor to provide an output indicative of the presence of a document.

2. The invention as claimed in claim 1, in which:

said housing comprises a body having openings into which the light source and the sensor are fitted; and said openings are aligned in the housing to permit light from the light source to be reflected from the reflective surface to energize the light sensor and to be reflected from the surface of a document in a manner causing it not to energize the light sensor.

3. The invention as claimed in claim 1, in which:

the light source is a light emitting diode and the sensor is a phototransistor; and said housing comprises a body having openings into which the light source and the phototransistor are fitted;

said openings being aligned in the housing to permit light from the light source to be reflected from the reflective area to energize the phototransistor and to be reflected from the surface of a document in a manner causing it not to energize the phototransistor.

4. The invention as claimed in claims 1, 2 or 3 in which:

the reflective surface of the drum is formed by the flat-bottom of an annular flat-bottomed groove, wherein the open side of the groove terminates in the cylindrical outer surface of the drum.

5. The invention as claimed in claims 1, 2 or 3, in which:

the drum includes an annular groove extending from the outer surface to form the reflective surface with a lesser radius than the outer surface.

6. The invention as claimed in claims 1, 2 or 3 in which:

the light source and the light sensor are coupled to track sensor controller means; and said track sensor controller means provide controls to adjust the intensity of light from said light source.

7. The invention as claimed in claim 5, in which:

the housing supporting said light source and said light sensor includes a bracket having seats for accepting and holding the light source and the light sensor in rigid positions relative to each other to enable accurate alignment of the light paths from the light source to the light sensor.

8. The invention as claimed in claim 5, in which:

the housing incorporates lips serving to support the light source and the light sensor;

said lips serving also as screens to reduce the amount of light transported over a portion of the path between the light source and the light sensor.

9. The invention as claimed in claim 4, including:

a document guide extending part way around the face of the drum to present an inner surface to divert documents from one linear path to another;

said light source and said light sensor being positioned to have surfaces extending through the wall of the document guide and beyond te inner surface of said wall;

whereby documents passing between the inner surface of the wall of the document guide and the face of the drum are enabled to sweep over and clean the surfaces extending through the wall.

* * * * *

UNITED STATES PATENT AND TRADEMARK OFFICE
CERTIFICATE OF CORRECTION

PATENT NO. : 4,365,151
DATED : December 21, 1982
INVENTOR(S) : Harold A. Fasig & Anthony Horak It is certified that error appears in the above—identified patent and that said Letters Patent is hereby corrected as shown below:

Col. 1, Line 58, should be "Ease in mounting the"

Col. 2, Line 66, should be "of the LED and the"

Signed and Sealed this

Twelfth Day of April 1983

[SEAL]

Attest:

GERALD J. MOSSINGHOFF

Attesting Officer      Commissioner of Patents and Trademarks